US008939111B2

(12) United States Patent
Berntsen

(10) Patent No.: US 8,939,111 B2
(45) Date of Patent: Jan. 27, 2015

(54) METHOD AND SYSTEM FOR FENCING ANIMALS WITHOUT USING A PHYSICAL FENCE

(75) Inventor: Oscar Hovde Berntsen, Batnfjordsora (NO)

(73) Assignee: Nofence AS, Batnfjordsora (NO)

( * ) Notice: Subject to any disclaimer, the term of this patent is extended or adjusted under 35 U.S.C. 154(b) by 0 days.

(21) Appl. No.: 13/517,991

(22) PCT Filed: Dec. 22, 2010

(86) PCT No.: PCT/NO2010/000482
§ 371 (c)(1),
(2), (4) Date: Jun. 21, 2012

(87) PCT Pub. No.: WO2011/087369
PCT Pub. Date: Jul. 21, 2011

(65) Prior Publication Data
US 2013/0008391 A1    Jan. 10, 2013

(30) Foreign Application Priority Data

Dec. 23, 2009 (NO) .................................. 20093587

(51) Int. Cl.
*A01K 15/04* (2006.01)
*A01K 15/00* (2006.01)

(52) U.S. Cl.
CPC ................ *A01K 15/00* (2013.01); *A01K 15/04* (2013.01)
USPC ........................................................ 119/721

(58) Field of Classification Search
USPC .................................. 119/719, 721, 856, 859
See application file for complete search history.

(56) References Cited

U.S. PATENT DOCUMENTS

| 5,565,850 | A |  | 10/1996 | Yarnall, Jr. et al. |
| 5,949,350 | A |  | 9/1999 | Girard et al. |
| 6,043,748 | A | * | 3/2000 | Touchton et al. .......... 340/573.3 |
| 6,067,018 | A | * | 5/2000 | Skelton et al. ............. 340/573.3 |
| 6,232,880 | B1 |  | 5/2001 | Anderson et al. |
| 6,581,546 | B1 |  | 6/2003 | Dalland et al. |
| 2004/0070508 | A1 |  | 4/2004 | Bach et al. |
| 2005/0139169 | A1 |  | 6/2005 | So |
| 2007/0044732 | A1 | * | 3/2007 | Araki et al. ................... 119/721 |
| 2008/0035072 | A1 |  | 2/2008 | Lee |
| 2008/0272920 | A1 |  | 11/2008 | Brown |
| 2008/0276879 | A1 | * | 11/2008 | Marsh .......................... 119/719 |

FOREIGN PATENT DOCUMENTS

WO        WO/0057692        10/2000

* cited by examiner

*Primary Examiner* — Monica Williams
*Assistant Examiner* — Jessica Wong
(74) *Attorney, Agent, or Firm* — Ladas & Parry LLP

(57) ABSTRACT

A system for invisible fencing for animals, that is a device mounted on animals. The device checks Global Navigation Satellite System ("GNSS") position measurements against an area that is defined in the device. The area can be defined as a combination of several areas with different characteristics. An area may also be defined as dynamic. The system calculates the shortest distance to this area based on actual GNSS position. If position measurements show that the animal has a position that is outside the area, correction will be performed as a combination of audio signal and electric shock. The correction is made by increasing the audio frequency proportionally with the calculated distance to the area. When the audio frequency has reached an upper limit, one single electric shock is given, and possible further correction is resumed from the position where the electric shock was given.

28 Claims, 6 Drawing Sheets

METHOD AND SYSTEM FOR FENCING ANIMALS WITHOUT USING A PHYSICAL FENCE

Figure 1A:
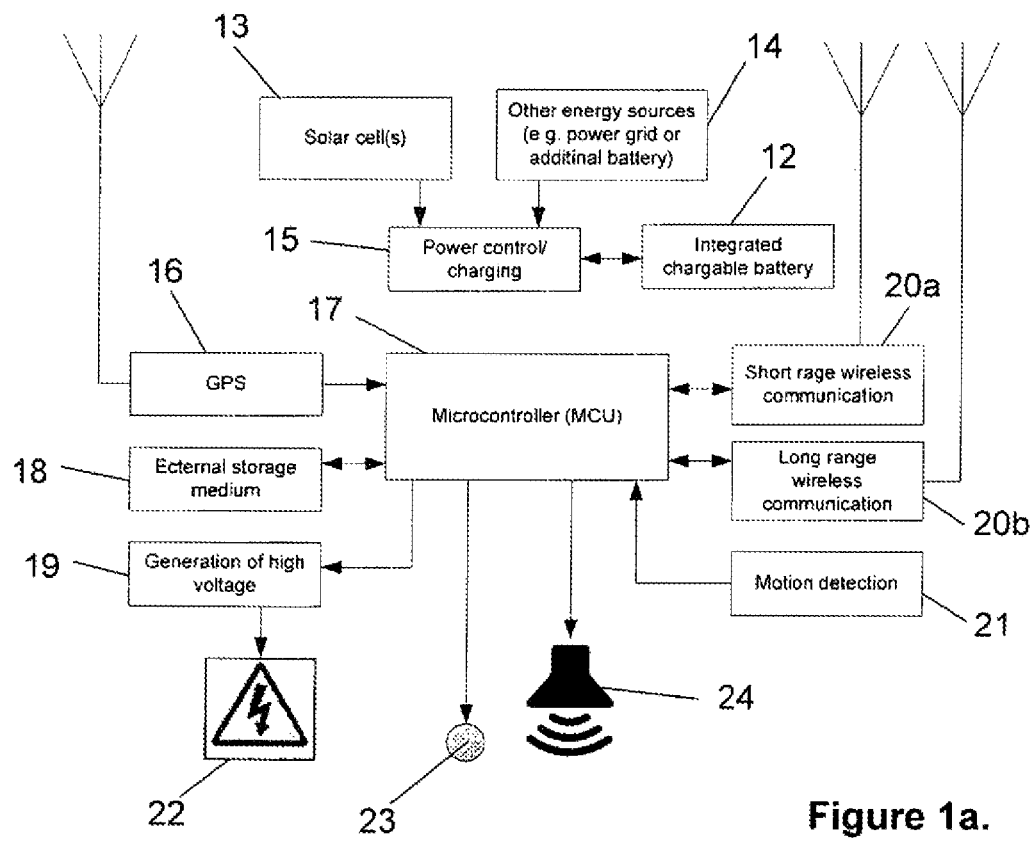

This application is a 371 of PCT/NO2010/000482, filed on Dec. 22, 2010, which claims priority to Norwegian patent application number 20093587, filed Dec. 23, 2009, which is incorporated herein by reference.

The present invention relates to a method for fencing animals without using a physical fence, according to claim 1.

Furthermore, the present invention relates to a system for fencing animals without using a physical fence, according to the preamble of claim 19.

BACKGROUND

Everyone who have had and have farm animals or pets know that to prevent animals from entering areas they should not be can be challenging. This usually requires fencing, which is more or less demanding. Good animal welfare is desirable for all animal owners. Lack of animal welfare is often caused by reduced freedom. This is often caused by difficulties in building fences that are good enough and that provide adequate space.

Pastures grow, and the cultural landscape, most places is in the process of disappearing. This is a trend which grows worse every year. The reason for this is not one-sided. Both that the growing season gets longer each year and the number of grazing animals is reduced contribute to the fact that we do not have the ability to maintain an open landscape. The greatest reason for this is that the number of grazing animals in uncultivated land is reduced due to fencing is costly and time consuming. Many therefore see that the profitability in conducting grazing animals is not large enough in relation to workload. This results in that overgrown is and becomes an increasing problem. It is necessary to think new. In addition to this the pasture represents a resource that to a low degree is utilized. Grazing animals can utilize this resource in the best manner.

For some grazing animals, such as cattle, it is common to gradually expand the grazing area. This is to increase the utilization of the pasture. Today's systems do not provide a sufficient opportunity to implement this because it is both time consuming and an extensive operation. In most cases this is not done in a sufficient extent. There is therefore a need for an invention which can realize automatic strip grazing. In this way, the pasture could be utilized in the best possible way.

Milk cows live usually their entire life inside. The reason for this is the amount of work required to release milk cows for grazing. The workload is great because it today is necessary with manual collection of animals before milking is performed. Both if manual milking is done, but also if a milk robot is used. It is therefore a need for an invention that allows automatic collection of animals. This could increase the possibilities of releasing milk cows to pastures with no extra effort.

Invisible fencing ("Virtual fencing") of animals is described in, amongst others, in the publications US2008272920A, U.S. Pat. No. 6,581,546B, US2002196151A, WO0057692A, US2002017995A, U.S. Pat. No. 5,868,100A, US20080035072, U.S. Pat. Nos. 6,956,483 and 5,791,294.

None of these describe in detail how stimuli or correction should be performed, except that audio and/or electric shock is used. This with the exception of WO0057692A. In WO0057692A is however used triangulation of RF signal strength in the definition of an area. It is defined that warning is given in the form of that the sound level increases in four steps. It is then given sound signals in pulses. When the distance to a fence is over a certain distance, electric shock is given in certain intervals. The disadvantage with these four steps of alert must lie within a limited extent to avoid that each of these steps in stimuli not continues if the animal turns and moves back in the correct direction. It does not take into account possible panic. But the biggest insufficiency is the handling of animals that do not respond as intended. If the animal does not understand that it must return to avoid stimuli, the animal may experience continuous electric shocking. This could result in suffering for the animal.

One publication, U.S. Pat. No. 6,581,546B, describes dynamic change of area, but it is not used in connection with the change of grazing land. It is used as a method to prevent the animal from moving past the area of stimuli.

The most important issue regarding fencing of animals without the use of a physical fence, is that the animal must be given an intuitively understandable warning signal before an unpleasant stimuli is applied to the animal, comparable to the visual warning a physical fence provides. This warning signal must give the animal a good opportunity to avoid future discomfort, and at the same time instruct the animal to move in the right direction (reverse). How this should be done is not well defined in the aforementioned publications. Disadvantages of prior art is thus that the described solutions may result in confused animals. They are neither adapted for both automatic collection of animals towards a defined area and migration of animals to new areas. The mentioned publications take in addition not in consideration that technical problems may arise. Also how these problems should be handled to avoid unnecessary distress or escape.

Testing of systems like this has proven a need for a system that automatically can adapt the discomfort (the electric shocks) strength to the animal that carries the system. This is because some individuals do not react as desired on the applied discomfort and may choose to cross the invisible border if desired when the drift is sufficiently strong.

Some animal species have a particularly prominent herd instinct. It is important that a system of invisible fencing takes account for this. None of the above publications mention this as something that must be taken into account. It is also a risk that a system for invisible fencing may unintentionally separate animals in a herd, which is important to take into account. This is important so good animal welfare is achieved.

OBJECT

The main object of the present invention is to provide a system and a method that improves the above-mentioned disadvantages of the prior art.

It is an object of the present invention to provide a system and a method that corrects an animal in an improved way by providing intuitive understandable correction.

It is further an object of the present invention that it should result in reduced needs for animal training by that it intuitively understands how to avoid discomfort.

It is further an object of the invention to achieve reduced animal stress.

It is also an object of the present invention to enable increased flexibility in husbandry and to provide new opportunities in the use of grazing animals by introducing dynamic change of area.

It is finally an object of the present invention that it will provide opportunities for automatic collection of animals.

THE INVENTION

A method according to the invention is described in claim 1 Preferable features of the method are described in the claims 2-18.

A system according to the invention is described in claim 17. Preferable features of the system are described in the claims 19-28.

A system according to the invention includes a portable device for attachment to an animal. The portable device may include one or more of the following devices:

Fastening means for attachment to an animal, such as an enclave or a collar,
One or more energy sources (e.g. battery/batteries, solar cell(s)).
Microcontroller provided with means and/or software for realization of invisible fencing, and provided with external or internal storage means.
Global Navigation Satellite System (GNSS) receiver.
Audible signal transducer.
System for generating electric shock.
Status indication in the form of a multi-color LED (Light Emitting Diode).
Acceleration switch used in connection with wake-up from a power saving mode.
One or more devices that enables wireless data communications.
Manual operation in the form of one or more buttons.

The microcontroller is provided with software for controlling the system. In the microcontroller is stored one or more areas which the animal can move freely inside/outside in the form of GNSS coordinates. These coordinates represent corners in a polygon. Measured position is used to calculate distance to the nearest fence line. Next is controlled if the position is within legal area or whether it is outside. The distance is used when correction is applied in the form of audible signals followed by an electric shock.

The system further includes a control unit for communication and updating of the portable device. The control unit is, for example, a mobile phone, computer or GNSS with wireless communication means, which is provided with software or means for communication and updating the portable device. The control unit can also be used to retrieve stored data from the portable device. The device can also be configured to provide messages to the control unit(s) in certain cases.

What distinguishes the present the invention from the prior art include:

Stepless increase of audio frequency, proportional to the distance to a defined area, before the punishment given.
Electric shock is given as a single shock at a given, upper, audio frequency.
When an electric shock is given, a new warning starts based on the shortest recorded distance to a fence, which distance is continuously updated after the first shock.
Only one electric shock is given for each time the audio frequency reaches a given upper frequency level.
Electric shock can be individually customized based upon system log data.
If the distance is reduced, correction is immediately terminated.
To ensure fair warning before electric shock, it is implemented a limitation in how quickly an increase in distance (and audio frequency) can be done to ensure that the animal should not be punished due to inaccurate position measurements.

If the animal's speed exceeds a certain level, the correction ends, as this speed means that the animal is experiencing panic, and is probably hunted. When the speed gets down to normal level, correction is resumed.

The purpose of this is that correction should be perceived by the animal as understandable, and based on this intuitively behave to avoid electric shock. It is therefore a minimal need for animal training.

In addition, the invention takes the flexibility of invisible fencing by using GNSS position measurement further by defining dynamic fencing. This includes that an invisible fencing can be changed dynamically from a defined start area, and into an end area. This realizes a solution to practical challenges, such as for example, strip grazing.

The invention also results in reduced needs for training of animals in that they intuitively understand how to avoid discomfort. Reduced needs for animal training will be important in terms of less time spent in training, and that time spent in collection of escaped animals will be greatly reduced. This could also be viewed as a convenient feature up against conventional electric fences.

The invention allows further flexibility in husbandry and provides new opportunities in the use of grazing animals by introducing dynamic area changing. This will provide new opportunities for increased utilization of grazing land, especially when used on cattle. This is known as strip grazing and is a known grazing principle, but is performed too rarely today. The invention will increase the use of such approaches of performing grazing.

Further preferable features and details of the present invention will appear in the following example description.

EXAMPLE

Figure 1B:
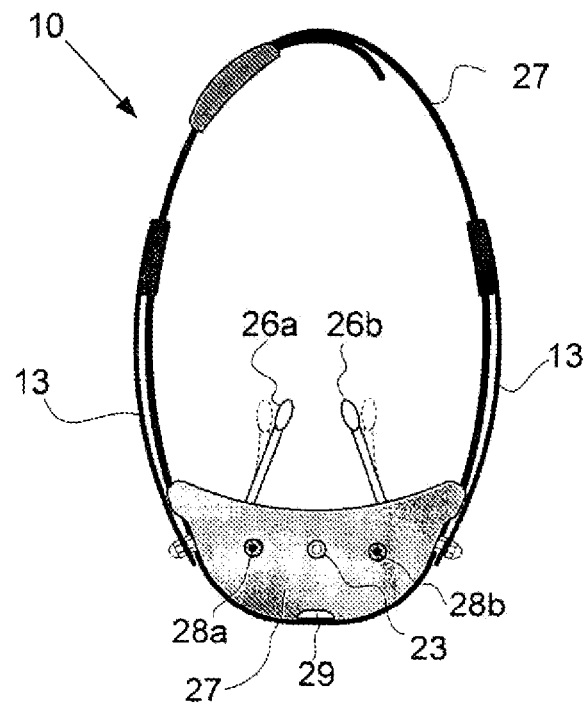
Figure 2:
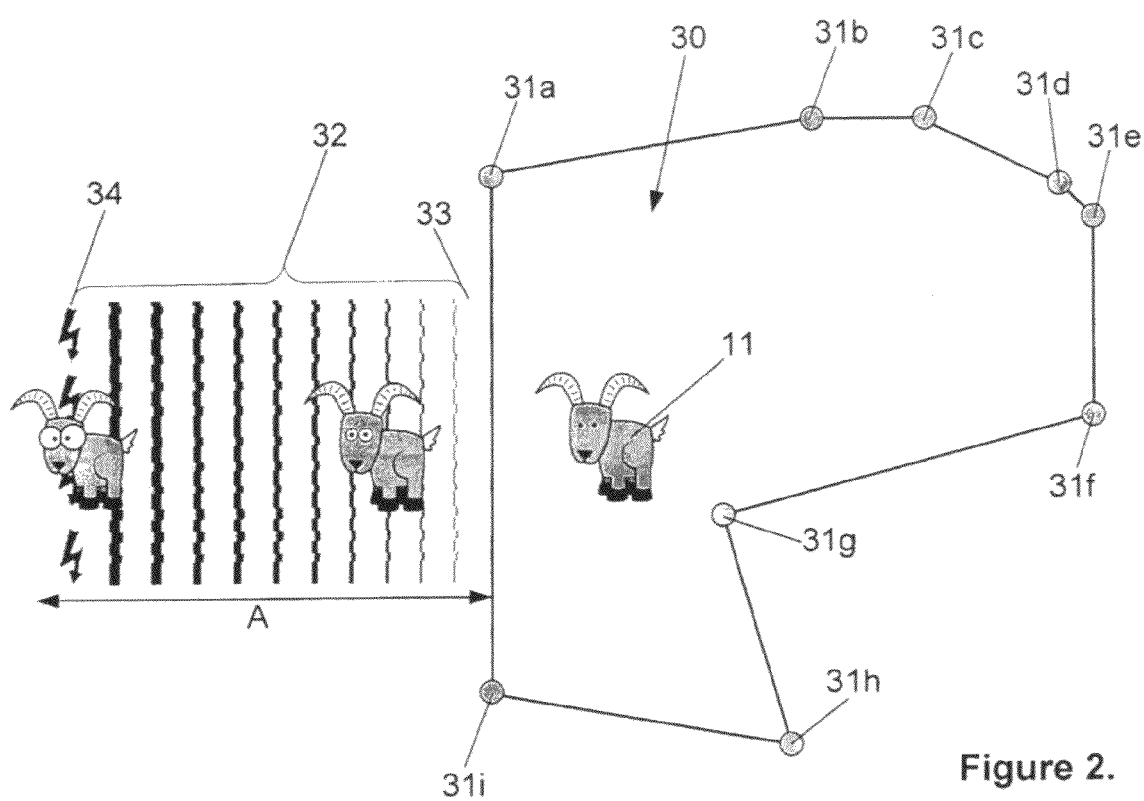
Figure 3:
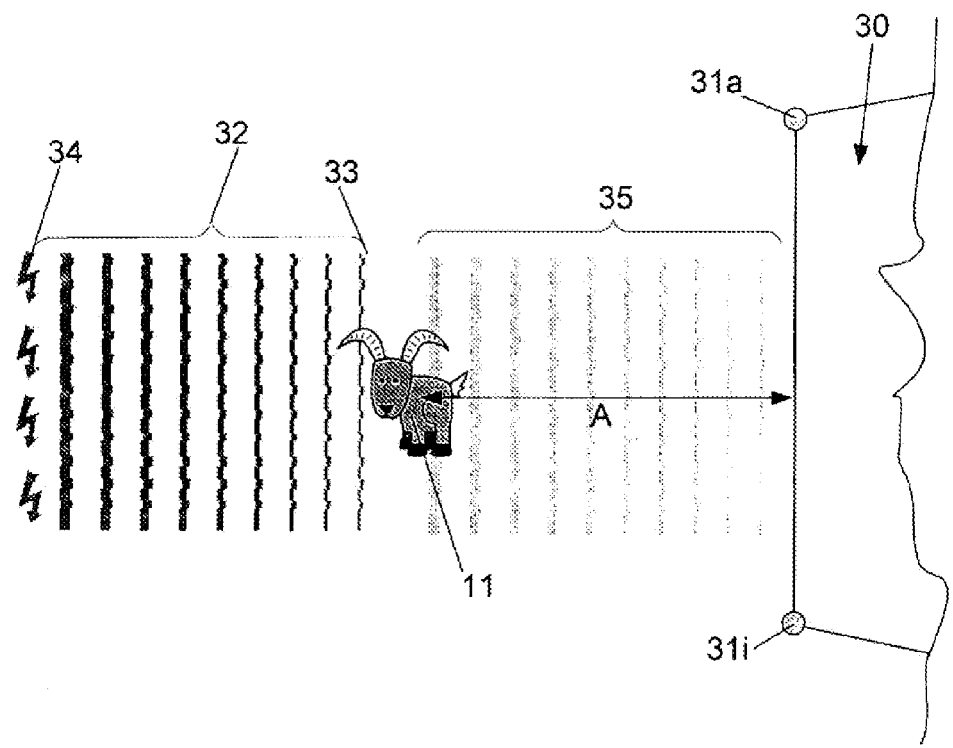
Figure 4:
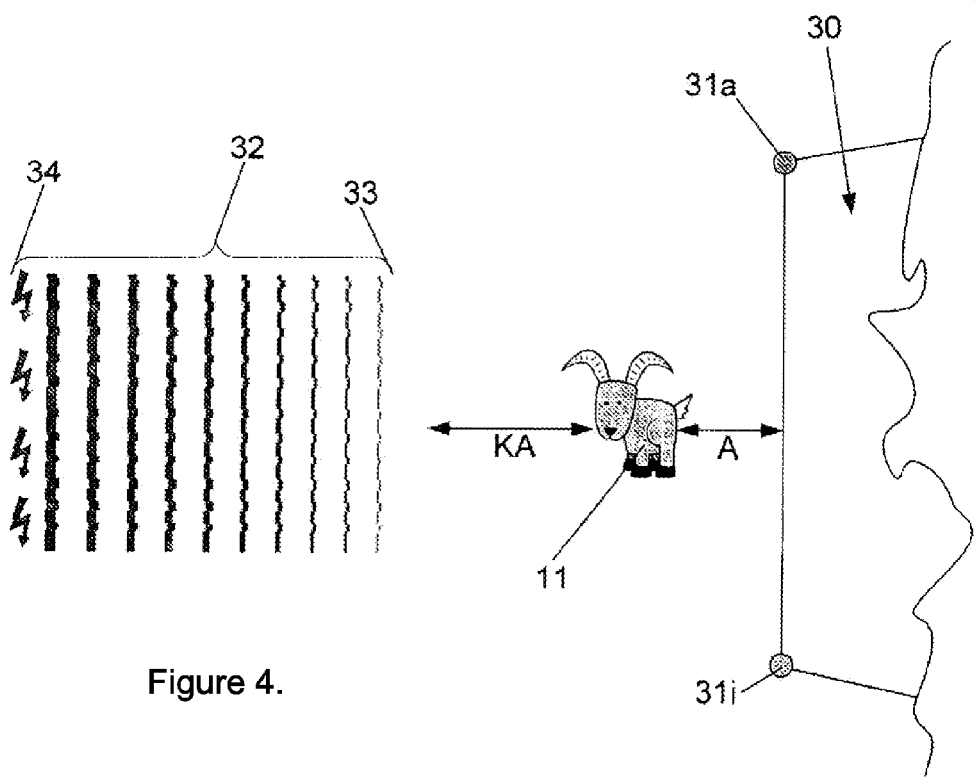
Figure 5:
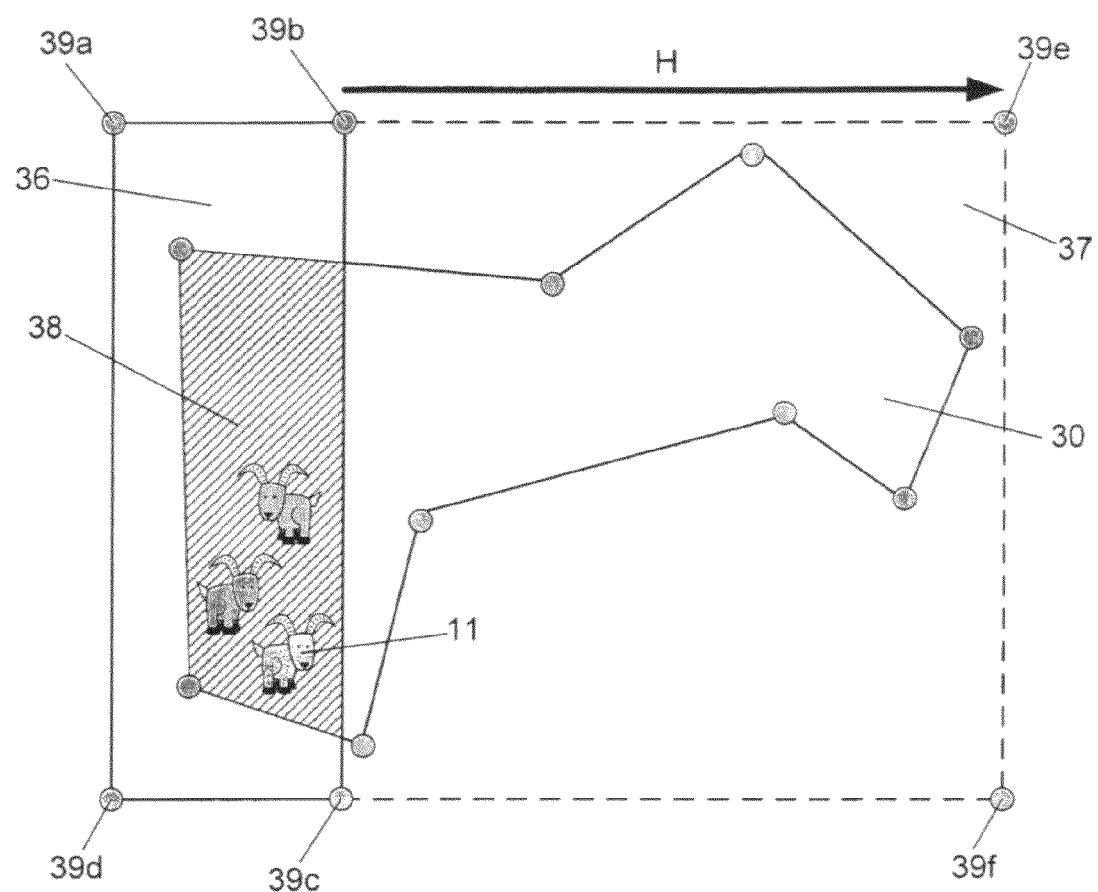
Figure 6:
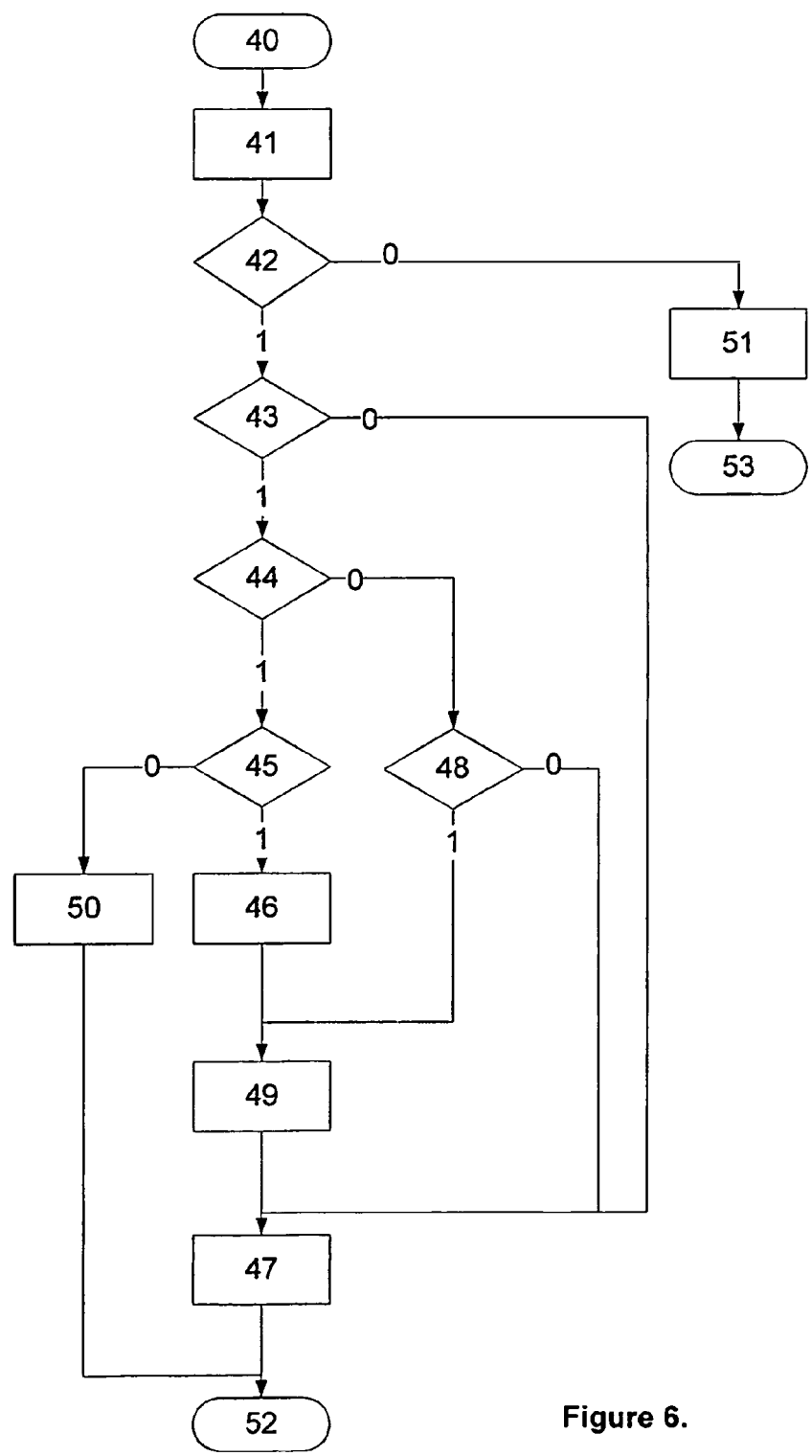
Figure 7:
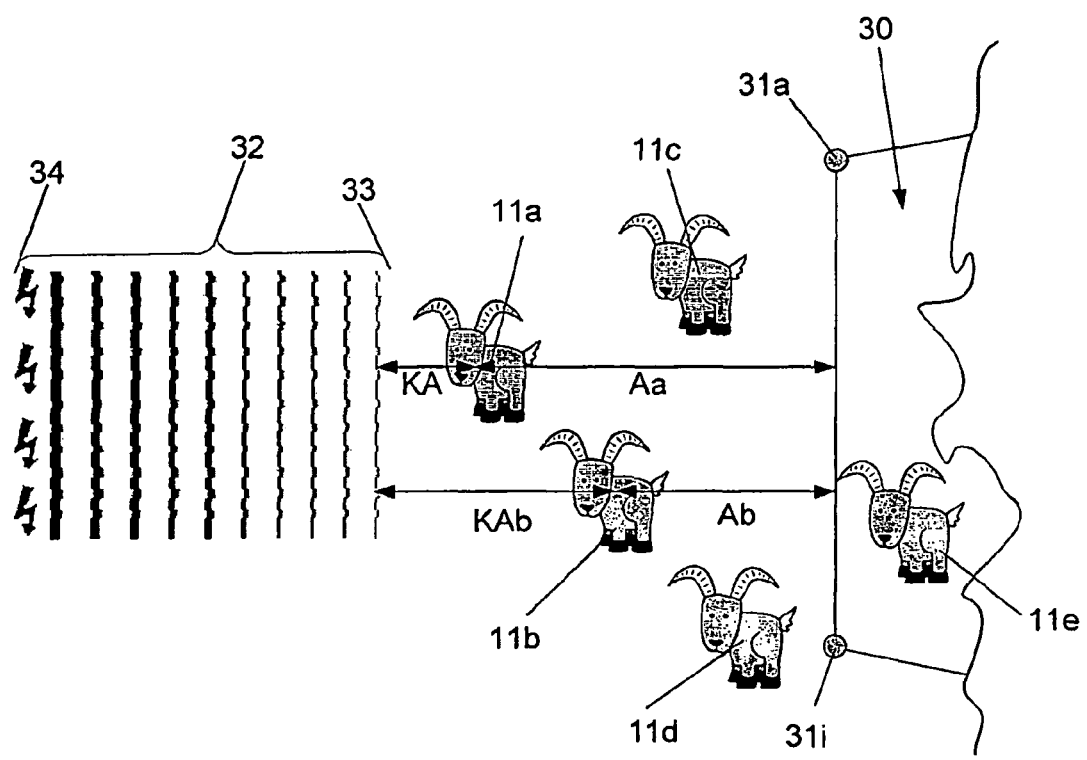

The invention will be described in detail below, with reference to the attached figures where:

FIG. 1*a* shows a schematic overview of a portable device for a system according to the invention, FIG. 1*b* shows a schematic overview of a portable device in FIG. 1*a*, FIG. 2 shows a schematic drawing illustrating how a correction is done when an animal moves out of legal area, FIG. 3 shows a schematic drawing illustrating how correction is done when an animal undeserved ends up outside the area, FIG. 4 shows a schematic drawing illustrating the relationship between area distance and correction distance, FIG. 5 shows an example of multiple simultaneous areas and an example of a dynamic area, FIG. 6 shows a flow diagram of a method according to the invention, and FIG. 7 shows a schematic drawing that extends the principle in FIG. 4 by that it is the herd distance to correction which is used to define the individual's distance to the correction.

Referring firstly to FIG. 1*a*, which shows a schematic overview of a portable device 10 for the system according to the invention. The portable device 10 according to the invention includes fasteners 25 (see FIG. 1*b*), such as a necklace or enclave for securing the portable device 10 to an animal 11. The portable device 10 includes further one or more means for power supply, preferably rechargeable batteries 12, which can be recharged using one or more solar cells 13 or charging from a power grid 14 or the like. The portable device 10 further includes a power management system 15 for controlling the power supply/charging of the batteries 12. The portable device 10 further includes a GNSS receiver 16 (Global Navigation Satellite System) to receive position signals.

The portable device 10 further includes a microcontroller 17, which is provided with internal and/or external storage means 18.

The portable device 10 also includes an electric circuit 19 for generating high voltage electric shock 22. This is a circuit which includes a transformer for generating a high voltage electrical potential. This potential is transferred into two flexible electrodes 26*a-b* (see FIG. 1*b*) that affects the animal's skin on each side of the animal's neck. The animal will then experience this potential as an unpleasant but harmless electric shock.

Furthermore, the portable device 10 includes wireless communication means 20*a-b*, preferably both for short-range communication 20*a* and long range communication 20*b* for communication with a control unit (not shown) of the system. The control unit can, for example, be a mobile phone, computer or the like which is equipped with software and/or means for wireless communication and for updating the portable device, and to retrieve stored data and to receive messages at specific cases.

The portable device 10 is further provided with means 21 for acceleration detection, which is used to determine if the portable device 10 is in motion. This, in turn, is used for wake-up from power saving mode, and to trigger messages on possible death. The system defines, based on calculated distance to the border, how long the power saving mode should last until motion again is checked through the use of acceleration switch 21. If no motion is detected during this time, there is no need for the system to exit power saving mode.

Furthermore, the portable device is provided with a status indicator 23, which indicates status in terms of colors, such as red, green and blue, which can indicate, errors in the device, status in connection with area registration and status in connection with wireless connection.

The portable device 10 is also provided with audio means 24, for example a piezo electric buzzer to generate warning tones as correction. The buzzer can, for example, be directly run from the microcontroller 17 by means of pulse width modulation.

Reference is again made to FIG. 1*b* which shows a schematic overview of an example of the portable device in FIG. 1*a*. The portable device 10 includes in addition to the above described electronics an enclave 25, collar or the like for fastening the portable device 10 to the animal 11, the enclave 25 size preferably is adjustable so that it can be adapted to the individual animal 11. The portable device 10 includes preferably an encapsulation 27, wherein the above-described electronics are encapsulated, which encapsulation preferably creates a watertight environment for the electronics while protecting it from strokes and shocks. The above-mentioned solar cells 13 may be arranged so that they extend along the enclave 25, on each side of the encapsulation 27 and is attached to the enclave 25 and encapsulation 27, respectively, by means of suitable means. The flexible electrodes 26*a-b* for electric shock preferably extend from the encapsulation 27 and into the enclave 25. The portable device 10 may further be provided with a user panel with one or more buttons 28*a-b* for manual operation of the portable device 10. Furthermore, the portable device 10 may include an alphanumeric display (not shown), which may be integrated as a touch-sensitive display.

The encapsulation 27 may also be arranged with fastening means 29 for arrangement of a bell (not shown).

Reference is now made to FIG. 2 showing a principal drawing of how the correction of an animal 11 is performed according to the invention, when an animal 11 is provided with a portable device 10 as described above. An area 30 the animal 11 is to keep within is defined as GNSS coordinates 31*a-i*. These points 31*a-i* represent corners of a polygon which represents the area 30.

When the animal 11 provided with the portable device moves out of the area 30, the system according to the invention starts to correct. This manifests itself as an audible beep tone 32. The frequency of this beep tone 32 may be configured from a start frequency 33 and frequency of pain 34. The frequency of pain must always be higher than at the start. The distance A from the area 30 to start of the audio signal 33, is configurable. This distance A may be configured as negative or positive.

When the animal 11 moves out of the area 30, it will become aware of the beep tone 32. If the animal 11 returns so that the distance A is reduced, the beep tone will immediately cease. But if the animal 11 moves so that the distance A increases, the frequency of the beep tone 32 will increase proportionally with the distance A to the area 30. When the animal 11 has moved out to a defined pain frequency 34, a short electric shock will be given to the animal 11. When this shock is given, further correction will cease, and the configured warning area will have a new starting point that corresponds to the distance A from the area 30 to the start 33 of the correction.

The system may perform logging of various data to internal or external storage means 18. These log data can be used, for example, to determine the power of the electric shock. In this way, the electric shock may be individually adapted to the animal that carries the system. This is a solution that has proven beneficial through testing on goats.

Reference is now made to FIG. 3. The previous correction 35 is now displaced to the animal's position at electric shock 34. Further correction will happen in exactly the same manner as before. If the animal 11 moves closer to the area 30, the distance A to the correction's start 33 is continuously updated to be equal to the animal's distance A to the area 30. If the animal 11 turns so that the distance A increases, the correction is again experienced. When the animal 11 is back into the area 30, the system resets and is ready for new correction.

The animal 11 may end up outside the defined area 30 undeserved, either because the area 30 is changed by, for example, collecting animals, or if the system has been disabled for a period. The cause of such deactivation may also be due to detection of panic. Such situations should not result in discomfort for the animal.

Reference is now made to FIG. 4 which shows a schematic drawing illustrating how the correction is done when the animal 11 undeserved ends up outside the active area 30 and which is illustrating the relationship between distance to area A and distance KA to the correction. The animal 11 will get a limited freedom to move away from the area 30 without experiencing correction. This freedom is defined as a configurable distance KA to the beginning 33 of the correction. The distance KA will be constant as long as the animal 11 moves in a way that reduces the distance A to the area 30. If the animal 11 moves in a way that results in that the distance A is increasing, the animal 11 will approach the correction area and will be able to detect this in the form of the previously known beep tones 32. When the animal 11 is within the area 30, the system is reset and is ready for next time the animal 11 moves out of the area 30.

To ensure that no herd is split when the system activates this degree of freedom, it is opened for the distance KA to be changed based on herd's distance to the beginning 33 of correction. To explain this, it is referred to FIG. 7. All units 10 that are mounted on the animals 11*a-d*, can be members of a local wireless network. In this way, all the units have information about the other animals distance to the beginning 33 of correction. In this example, the animal 11a has the longest distance to the polygon 30. This distance Aa, will in this case define the degree of freedom KA for the others. The animal 11b will have its degree of freedom defined by the formula KAb=(Aa−Ab)+KA. Subsequent references to the degree of freedom KA, may use the degree of freedom for the herd.

Reference is now made to FIG. 5 which shows a schematic drawing showing a method for the realization of dynamic fencing. In this example, the area 30 represents an area the animal 11 is not to move outside. There is defined two additional other areas 36 and 37. These two areas 36 and 37 represent the starting and ending of the dynamic fencing. The smallest area 36 represents the area which the animals 11 should remain within at the start of dynamic fencing.

When several areas are defined as fencing simultaneously, legal area is restricted to the area where these areas overlap, shown as a shaded area 38 in FIG. 5.

The areas 36 and 37 that realize dynamic fencing are preferably defined by an equal number of points. These areas 36 and 37 are also defined as polygons, although they in this example can be called rectangles. The starting area 36 is defined by the points 39a-d. The end area is defined by the points 39a, 39e, 39f, and 39d. All the points in the starting area 36 should move with a given speed H to a defined point in the end area 37. The result of this, in this example, is that there are only two areas that define the legal area 38. Where one area is marked 30 and the other area is a combination of areas 36 and 37.

A method according to the invention can be summarized in the following steps:
a) system reboot or system wake-up from power saving mode,
b) acquiring current position, speed and measurement validity for an animal,
c) check the current position of the animal in relation configured area(s),
d) calculate distance to nearest border line in configured area(s),
e) check whether the current position of the animal from step c) is within the configured area(s), where if the controlled position in step c) is within the configured area(s) set the system in power saving mode and if the position step c) is outside the configured area(s) the method continues to step f),
f) examine whether the calculated distance in step d) is such that correction should be performed,
g) start correction in the form of audio, where audio frequency increases or decreases according to the calculated distance to the configured area(s),
h) examine whether the distance to configured area(s) is increasing and if it is, increase the audio frequency and if the audio frequency has reached a predetermined frequency, apply an electric shock to the animal, or else return to step g),
i) calculate the actual distance and register actual distance as a new starting point for further correction,
j) End correction and return to step b).

Step a) may also include communication with the control unit to acquire updates of defined areas and other parameters or characteristics. Wake-up from power saving mode is made after a predetermined period of time which is defined in relation to the calculated distance to the nearest border line in step d) by that means for acceleration detection controlled. If acceleration is detected, the defined method is performed. Otherwise, the system will wait for the same period of time before a new control of acceleration is made. If no motion is detected by the means for acceleration detection within a configurable period of time, this may indicate death. This is logged in the device's storage medium. It may also be configured that this shall trigger a message to an external device.

Step b) further includes error control. It involves control of battery voltage and possible errors in the various devices of the system. All such errors are logged in the device's storage medium, and it can also be configured that this shall trigger a message(s) to external device(s). It also includes that if the animal's position is within the configured area(s), the system enters power saving mode.

Step c) includes checking position against the previous position measurements, and provides an indication of how large area the animal has moved within. If this area is severely limited within a configurable period of time, it may mean that the animal is stuck. This is logged in the device's storage medium. It can also be configured that this shall trigger a message to an external device.

Step e) includes that if the speed from step b) exceeds a defined limit value during a given number of succeeding measurements, the system status is set to "panic". This status is recorded in the storage medium of the device, and possible further correction will not be performed and the system is set to power saving mode. If not, the method continues to step f). It may also be configured that this shall trigger a message to an external device. This status is reset when the speed reduces to lower than a threshold defined in the same number of succeeding measurements. It also includes checking the measurement's validity from the GNSS is registered. If this validity does not achieve a configurable threshold, possible correction will not be performed and the system's status is set to "Invalid" before the system enters power saving mode. It will in these two cases be used a defined degree of freedom at possible wake-up outside defined area.

Step f) includes checking whether the distance calculated in step d) is inside or outside a configurable distance from the configured area(s) to determine if the correction is to be performed or not. The configured distance is further used to determine how long the system is to stay in power saving mode.

Step g) includes increasing the audio frequency gradually with increasing distance from the predefined area, where the frequency is preferably increased proportionally with increasing distance.

Step h) includes updating a counter for the number of shocks. Each time the animal is given an electric shock, it is registered in a log internal the portable device's storage medium. The counter's value is included in the log. This will later be able to give an indication of the training needs. The counter is also used to possibly trigger a message to an external device.

The method also includes providing the animal with an increased freedom KA before correction when the animal has ended up outside the defined area as a result of one or more of the following cases:
a. system reboot,
b. redefinition of area(s)
c. panic detection,
d. invalid position measurement,
e. temporary system errors Panic is detected in the form of that the movement speed of the animal exceeds a certain configurable limit.

Reference is now made to FIG. 6 showing a flow diagram which shows how the system behaves according to the method. After the system 40 starts or wakes up from power saving mode, several functions are activated 41:

a) Self-test to ensure the device is working properly.
b) Speed registration. If the speed value is greater than a defined limit, a counter is increased. If this counter exceeds a configurable limit, this will mean that the system status is updated to "panic". The system is then updated with a defined degree of freedom KA.
c) Registering the validity of the position measurement. If this validity does not meet the configured requirements, the system is updated with a defined degree of freedom KA.
d) Registering position and further checking of the position measurement against the current area definition(s). This results in a calculated distance to the nearest border line for the current area.
e) Checking position against the preceding position measurements to detect possible if the animal is stuck.

The degree of freedom KA may come in addition to the herd's distance to the polygon 30, as explained in FIG. 7.

After this it is checked whether the position is within legal area 42. If the position is within, the system resets 51 which involves that, among others, the number of electric shocks is reset and the degree of freedom is reset. Then the system is set to power saving mode 53. The distance which is registered will be used further to determine how long the system is to stay in power saving mode before the control of the means for acceleration is done.

If the position however is outside, the distance is controlled if it is such that correction is to be performed 43. If not, possible started correction is terminated 47 and procedure is repeated 52. If the distance is such that correction is to be performed 43 and the distance to the border line is increasing 44, it is controlled if the audio frequency has reached the defined frequency level for electric shock 45. If this level is not achieved, the audio signal is updated 50 with a frequency which is defined from the calculated distance of 41. If the electric shock is to be given, it is done simultaneously with increasing 46 the number of shocks and actual distance is registered as a new starting point for further correction 49. Then further correction 47 is ended and the procedure is repeated 52.

If the distance to the border line is decreasing 44, and electric shock has been given 48, updated distance is stored as a new starting point for further correction 49. Possible started warning terminates 47 and the procedure is repeated 52.

MODIFICATIONS

In the description above it is described that two polygons with equal number of points must be defined for the use of dynamic areas which are resulting in one dynamic polygon. An obvious alternative solution of this will be that the same number of points in these polygons no longer is a limitation. A solution may be that dynamic areas are defined as one single polygon with dynamics associated with one and one point of the points of the polygon. In this way the polygon itself is not dynamic, but the points in the polygon.

The system can be updated to include ID tagging realized by, for example, RFID. An RFID reader can also be included which automatically can define the enclave's address in the local wireless network, similar to the animal's ID.

Physical design may change from being designed as an enclave to, for example, an ear tag or an implanted under the animal's skin.

Charging of batteries can be solved in new ways, for example, the use of a solution for collecting kinetic energy.

The portable device may further be arranged to include means for detecting animal's pulse/heart rate, which information can be used for controlling the portable device, and detection of panic.

The correction used in this system is called negative reinforcement. This means that it is notified if something negative is about to occur. In addition it may be natural to also introduce positive reinforcement by the use of specially trained dogs. One possibility is that dogs can operate with a dog trainer who is far away from the dangerous area the dog operates. Speaker(s) can make it possible for the dog trainer to communicate with the dog. Camera with wide-angle camera lens can be implemented to provide opportunities, for the dog trainer, to use the system as an extra eye. It may prove advantageous to use such a solution, for example in rescue operations avalanche areas or other special missions where it is great personal risk. An example may be, de-mining.

The invention claimed is:

1. A method for fencing animals without the use of a physical fence using a system including a portable device for attachment to an animal using a fastening device, which portable device is provided with a power supply, a Global Navigation Satellite System, microcontroller provided with an external or internal storage device, a means for generating an electric shock, and a communication device wherein the method comprises the following steps performed by the system:
  a) system reboot or wake-up from an automatically-activated power saving mode,
  b) acquiring current position, speed and validity for a position measurement for the animal,
  c) checking if the validity of the position measurement in step b) meets predefined criteria and/or if the speed measured in step b) is higher than a predefined level, and if the position measurement is invalid or the speed is higher than the predefined level, return to step a), otherwise proceed to step d),
  d) reviewing the current position of the animal in relation to defined areas defined by at least two polygons with different properties in the form of Global Positioning System points,
  e) calculating distance of the current position of the animal to the nearest borderline of the polygons,
  f) determining whether the current position from step b) is within the polygons, wherein if the position in step b) is inside the polygons, set the system to the automatically-activated power saving mode and if the position from step b) is outside the polygons, the method proceeds to step g),
  g) determining whether the calculated distance in step e) is an amount which requires correction to be performed, and, if the distance is an amount which requires correction to be performed, proceed to step h); and, if the distance is an amount which does not require correction to be performed, return to step b),
  h) starting correction in a form of affecting the animal in the form of audio, wherein the audio frequency increases or decreases gradually according to the calculated distance to the polygons, and proceed to step i),
  i) determining whether the distance to the polygons increases, and if it is increasing, determining whether the audio frequency has reached a predetermined frequency level for electric shock, and if the predetermined level is reached, applying an electric shock to the animal and proceeding to step j); if the audio frequency is below the predetermined level, return to step h), j) calculating actual position and registering actual position as a new starting point for further correction, and proceed to step k), k) end correction and return to step b).

2. Method according to claim 1, wherein step a) includes communicating with an external control unit for the system to acquire the Global Positioning System points for said polygons and other parameters or characteristics.

3. Method according to claim 1, wherein step b) includes that if the animal's speed is above a configured threshold, no further correction is performed, and a degree of freedom is activated and the degree of freedom is reset after a valid position measurement is done, and said valid position measurement shows that the animal is located within the polygons.

4. Method according to claim 1, wherein that if the position measurement in step b) does not meet the predefined criteria, the position measurement is defined as invalid and possible further correction is not performed, wherein a degree of freedom is activated and the degree of freedom is reset after a valid position measurement is made, and said valid position measurements shows that the animal is located within the polygons.

5. Method according to claim 1, wherein step e) includes that the calculated polygons borderline distance is used for determining how long the system is to stay in power saving mode.

6. Method according to claim 1, wherein step g) comprises checking whether the calculated distance in step e) is increasing or decreasing, which is used to determine whether correction should be performed or not.

7. Method according to claim 1, wherein step h) includes that the audio frequency is increased proportionally with increasing distance.

8. Method according to claim 1, wherein step i) includes updating a counter on a number of shocks, which number is logged and used to identify the animal's lack of understanding/confusion, and used to trigger a message to an external device.

9. Method according to claim 1, wherein the method further includes performing logging, which logging is used to adapt the power of the electric shock for the individual animal.

10. Method according to claim 1, wherein the method further includes giving the animal increased degree of freedom before correction when the animal has ended up outside the polygons as a result of one or more of these following cases:

i) system rebooting,
ii) redefinition of the polygons,
iii) panic detection,
iv) invalid position measurement,
v) temporary system error, wherein the degree of freedom is reset after a valid position measurement is made, and this measurement shows that the animal is located within the polygons.

11. Method according to claim 10, wherein the degree of freedom from the animal to where the correction is to be performed is defined as constant when one or more of the said i)-v) cases occur.

12. Method according to claim 10, wherein panic is detected when the animal's movement speed exceeds a given configurable limit.

13. Method according to claim 10, wherein in connection with panic, the correction is disabled, and the steps g)-i), and correction, step h) is resumed with limited degree of freedom when panic is no longer detected by that the animal's movement speed is below a given configurable limit.

14. Method according to claim 10, wherein to avoid inadvertently splitting of an animal herd in connection with correction, the method includes setting the degree of freedom for the animal according to a distance of the herd to a start of a correction.

15. Method according to claim 1, wherein the method includes the wake-up from power saving mode when cyclic control of an acceleration detection device indicates that the animal is moving, wherein a time between each cyclic control is given by the calculated distance of the current position of the animal to the nearest borderline of the polygons.

16. Method according to claim 1, wherein the method includes storing data, such as position data, information about a number of electric shocks, panic, and similar data of interest for evaluation in retrospect.

17. Method according to claim 1, wherein the method includes notifying an animal owner about abnormal circumstances comprising:

a) detection of panic based upon speed measurement, b) death based on acceleration detection, c) stuck animal based upon small position change over time given, d) low battery level, e) abnormally high number of electric shocks, and f) hardware or software error in the device.

18. Method according to claim 1, wherein the method includes that an animal owner may, at any time, poll the portable device's status or retrieve logged data from the portable device by use of the communication device.

19. A system for fencing animals without the use of a physical fence, which system includes a portable device arranged for attachment to an animal by a fastening device, which portable device includes power supply device, a Global Navigation Satellite System unit, microcontroller provided with an external or internal storage device, means for generating an electric shock, a communication device, and an audio device, wherein the system is arranged for continuous monitoring of an animal's distance to one or more configurable areas' border lines, which areas are defined by at least two polygons with different characteristics in terms of Global Navigation Satellite System points; and a means to automatically activate a power saving mode when said animal is positioned inside one or more of said at least two polygons.

20. System according to claim 19, wherein the portable device includes solar cells for charging the power supply.

21. System according to claim 19, wherein the portable device is provided with an apparatus for detecting acceleration.

22. System according to claim 19, wherein the system is provided with an apparatus for calculating the animal's speed of movement.

23. System according to claim 19, wherein the system is provided with an audio device for correction of the animal, said audio device emits an audio signal having an audio frequency which increases or decreases according to a distance the animal is from the polygons.

24. System according to claim 23, wherein the system is arranged to apply an electric shock to the animal when the audio frequency is at a predetermined frequency by means of an electric circuit for generating high voltage electric shock transferred to the animal via flexible electrodes.

25. System according to claim 19, wherein the polygons defined by Global Navigation Satellite System points are provided with one or more of the following characteristics:
- are defined as areas that the animal is to remain inside or outside,
- are provided with a time period where the polygons are to be active within,
- are defined as start or stop polygons of dynamic areas,
- are defined as dynamic polygons.

26. System according to claim 25, wherein the dynamic polygons defined by Global Navigation Satellite System points:
- are defined as two polygons with equal number of points and forming start and stop polygons, or
- are defined as a function which gives speed to a point in the start polygons and gradually moves closer to a corresponding point in the stop polygons.

27. System according to claim 26, wherein the speed is defined as a function of start time and end time, which function gives a distance the points are to be changed for a specified period of time, or that the speed is specified as a distance the points in the start polygons are to be changed with, which change is gradual for each time interval given.

28. System according to claim 19, wherein the system includes an external or internal storage device for logging data.

* * * * *